United States Patent [19]
Arakawa et al.

[11] Patent Number: 5,852,329
[45] Date of Patent: Dec. 22, 1998

[54] OPTICAL DISC MOLDING DEVICE AND MOLDING METHOD FOR OPTICAL DISC

[75] Inventors: Nobuyuki Arakawa, Kanagawa; Toshiyuki Kashiwagi, Tokyo; Asao Kurosu, Saitama; Yuji Akiyama, Tokyo; Shinsuke Kishi, Shizuoka, all of Japan

[73] Assignee: Sony Corporation, Japan

[21] Appl. No.: 834,159

[22] Filed: Apr. 14, 1997

[30] Foreign Application Priority Data

Apr. 26, 1996 [JP] Japan ..................................... 8-107729
May 15, 1996 [JP] Japan ..................................... 8-144990

[51] Int. Cl.⁶ .................................................. B29D 17/00
[52] U.S. Cl. ........................ 264/1.33; 264/106; 425/542; 425/810
[58] Field of Search ................................... 264/1.33, 106, 264/107; 425/810, 542

[56] References Cited

U.S. PATENT DOCUMENTS 4,879,082  11/1989  Kudo et al. ............................ 264/1.33
4,979,891  12/1990  Kitamura ............................... 264/1.33

FOREIGN PATENT DOCUMENTS 0 137 246   4/1985  European Pat. Off. .
0 220 725   5/1987  European Pat. Off. .
2 601 287   1/1988  France .
01 300442  12/1989  Japan .

Primary Examiner—Mathieu D. Vargot
Attorney, Agent, or Firm—Ronald P. Kananen

[57] ABSTRACT

An optical disc molding device has a pair of molds for injection molding a disc substrate within cavities, and a stamper supported within at least one cavity, for molding a data recording surface in such a manner that the inside diameter side of the stamper supporting surface of the cavity protrudes inwardly in the disc thickness direction from the data recording surface. The flatness of a laminated reference plane has thus been deteriorated by burrs occurring on a disc substrate.

10 Claims, 4 Drawing Sheets

OPTICAL DISC MOLDING DEVICE AND MOLDING METHOD FOR OPTICAL DISC

BACKGROUND OF THE INVENTION

The present invention relates to an optical disc molding device for injection molding a laminated optical disc and a molding method for an optical disc using this device.

The laminated optical disc is constituted as, for example, described below.

A data recording surface is formed on one surface of a translucent disc substrate made of, for example, polycarbonate or the like. This data recording surface is obtained by forming pits representing data to be recorded on one surface of the disc substrate by a stamper, and forming, on top of the pits, an aluminum film as a reflected film by spattering.

The diameter and thickness of the disc substrate are set to 120 mm and about 0.6 mm respectively. Although it is desirable from the viewpoint of request for higher density and the like to make the thickness of the disc substrate thinner, it is necessary to set the thickness of the optical disc to 1.2 mm in consideration of the standardization and the like of the optical disc devices.

Therefore, a translucent dummy substrate with a thickness of about 0.6 mm is stuck on the data recording surface through a bonding layer. The reflected film on the data recording surface is protected by the disc substrate and the dummy substrate and therefore, it is difficult to be subjected to mechanical damage from outside, and will give longer service.

A label indicating the content of the recording is printed on the surface of the dummy substrate.

The laminated optical disc is molded by such an optical disc molding device as shown in FIG. 1.

As shown in the figure, the optical disc molding device 1 has a stationary mold 2 and a movable mold 3, and a disc substrate is injection molded within these cavities 2a and 3a. Molten resin such as polycarbonate is injected through an injection tube 4 provided at the central portion of the movable mold 3, and a stamper 5 for molding the data recording surface is supported within the cavity 2a of the stationary mold 2.

The stamper 5 has ring-shaped flat board shape, and is sucked by ring-shaped suction 6 and suction pipes 7 disposed at equal intervals in the peripheral direction to be supported in such a manner that the stamper 5 comes into contact with a stamper supporting surface 2b of the cavity 2a.

This stamper 5 is pressed against one surface of the disc substrate by the injection pressure to form the data recording surface.

In a conventional optical disc molding device 1, when the disc substrate 8 is released from the stamper 5 after injection molding as shown in FIG. 2, a burr 9 occurs on the side of the inside diameter of the disc substrate 8. The burr is caused by small gaps between the stamper 5 and the stationary mold 2. Since the burr 9 protrudes outwardly in the disc thickness direction from the data recording surface of the disc substrate 8, there is the problem that when the disc substrates are pasted together, each other's burrs come into contact with each other, deteriorating the flatness of the reference plane.

On the other hand, when an attempt to reduce this burr 9 is made, the precision of the center hole of the stamper 5 becomes necessary, and therefore, there is the problem that it becomes difficult to control the lip of mold, thus deteriorating the operating efficiency, etc.

In addition, since post-machining and the like are required to remove the burr 9, there is the problem that the cost of production is increased, thus lowering the yield and the operating efficiency.

SUMMARY OF THE INVENTION

The present invention has been achieved to solve the above-described problems, and its object is to provide an optical disc molding device capable of preventing the flatness of the laminated reference plane from being deteriorated, easy to control the lip of molds and necessitating no post-machining to remove the burr from the disc substrate, and a molding method for the optical disc using the optical disc molding device.

According to the present invention, the above-described object is achieved by an optical disc molding device having a pair of molds for injection molding a disc substrate within the cavity, and a stamper supported within at least one cavity for molding a data recording surface, in which the inside diameter side of the stamper supporting surface of the cavity protrudes inwardly in the disc thickness direction from the data recording surface.

Also, according to the present invention, the object is achieved by a molding method for an optical disc so as to injection mold a disc substrate by supporting a stamper in which within at least one cavity of a pair of molds, its inside diameter side is caused to protrude inwardly in the disc thickness direction from the molding portion of the data recording surface.

Further, according to the present invention, the object is achieved by a molding method for an optical disc in which within at least one cavity of a pair of molds, a stamper for molding a data recording surface is supported, and the inside diameter side of the stamper is caused to protrude inwardly in the disc thickness direction from the data recording surface by means of injection pressure during disc molding so as to injection mold the disc substrate.

According to the present invention, the inside diameter side of the stamper supporting surface within the cavity protrudes inwardly in the disc thickness direction from the data recording surface. The stamper supported by the stamper supporting surface has been molded into a shape in parallel to the stamper supporting surface in advance, or is molded into a shape in parallel to the stamper supporting surface by means of the injection pressure during the disc molding.

Accordingly, even if a burr may occur on the inside diameter side of the disc substrate by releasing the disc substrate from the stamper after the injection molding, the flatness of the reference plane is not deteriorated because the data recording surface is molded higher than this burr.

DETAILED DESCRIPTION OF PREFERRED EMBODIMENTS

Now, hereinafter, preferred embodiments of the present invention will be described in detail in conjunction with the accompanying drawings.

In this respect, since the embodiments described below are preferred examples of the present invention, various technically preferred limitations are given, but the scope of the present invention is not limited to these embodiments, so long as there is no description to the effect that the present invention is particularly limited in the following descriptions.

Figure 1:
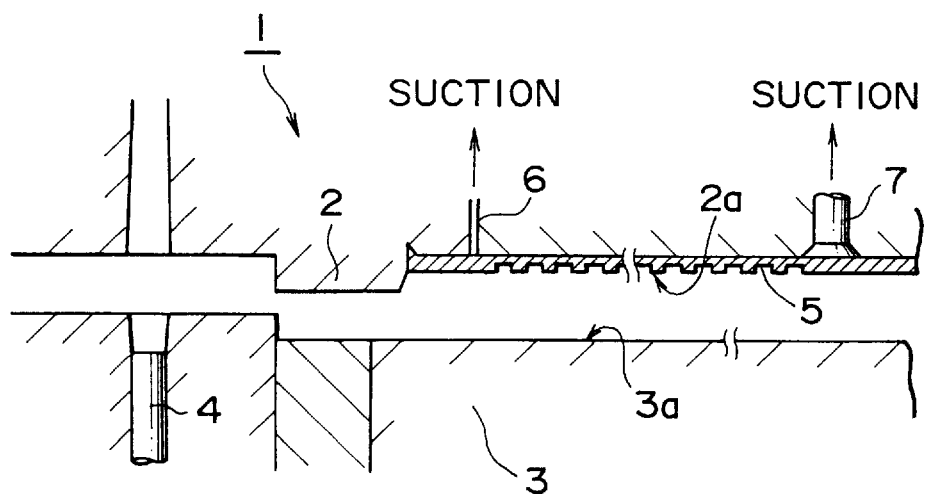
FIG. 1 is a schematic view showing a conventional optical disc molding device.
Figure 2:
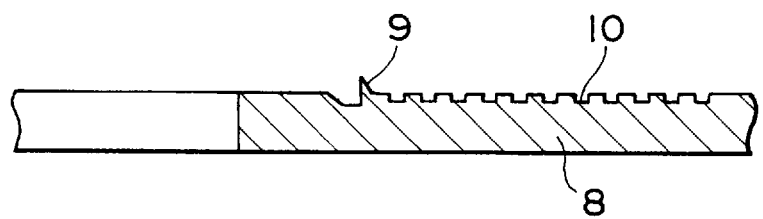
FIG. 2 is a schematic view showing a disc substrate molded by the conventional optical disc molding device.
Figure 3:
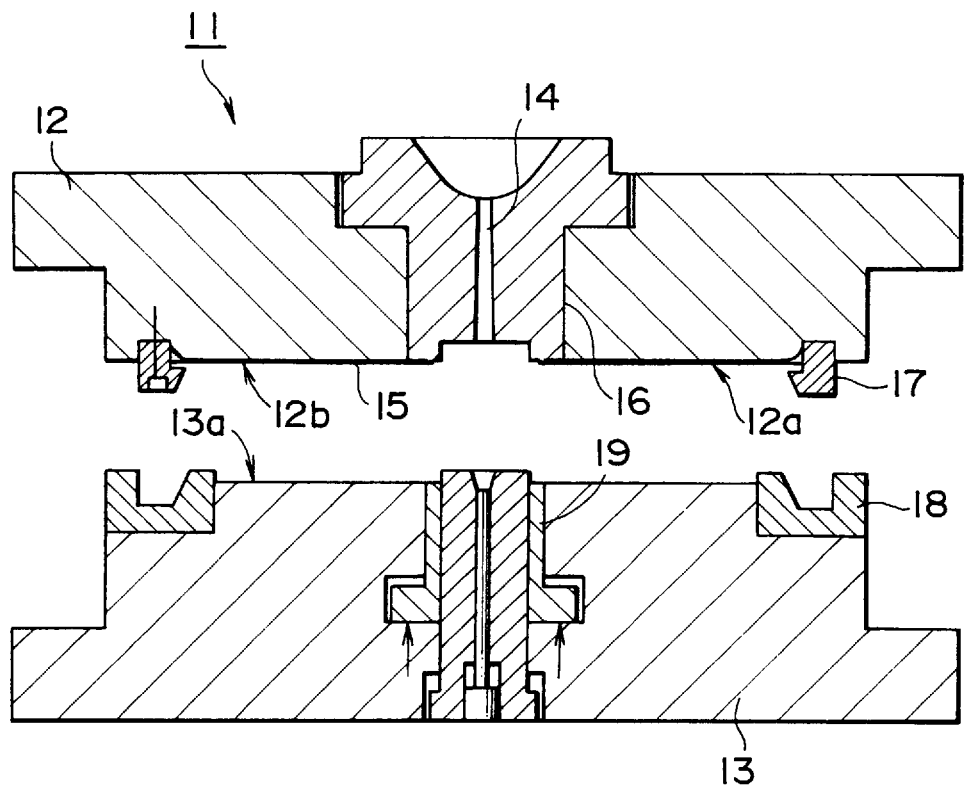
FIG. 3 is a schematic view showing an embodiment of an optical disc molding device according to the present invention.

FIG. 3 is a schematic view showing an embodiment of an optical disc molding device according to the present invention.

As shown, an optical disc molding device 11 according to this embodiment is composed of a pair of molds 12 and 13 to injection mold a disc substrate within cavities 12a and 13a therein.

In this embodiment, design is made such that one mold 12 is a stationary mold and the other mold 13 is a movable mold, but being not limited to this, both may be constituted as the movable mold.

At the central portion of the stationary mold 12, there is provided an injection tube 14 for injecting molten resin such as polycarbonate into space within cavities 12a and 13a combined.

On the other hand, within the cavity 12a of the stationary mold 12, there is supported a stamper 15 for molding a data recording surface on one surface of the disc substrate.

The stamper 15 has a ring-shaped flat board form, on the surface of which a pit replica on the data recording surface has been formed. This stamper 15 is sucked by suction 16 having a ring-shaped inner peripheral surface, and its outer peripheral edge portion is held by a bearing pawl 17 mounted to the stationary mold 12, and is mounted to the stamper supporting surface 12b within the cavity 12a.

Figure 4:
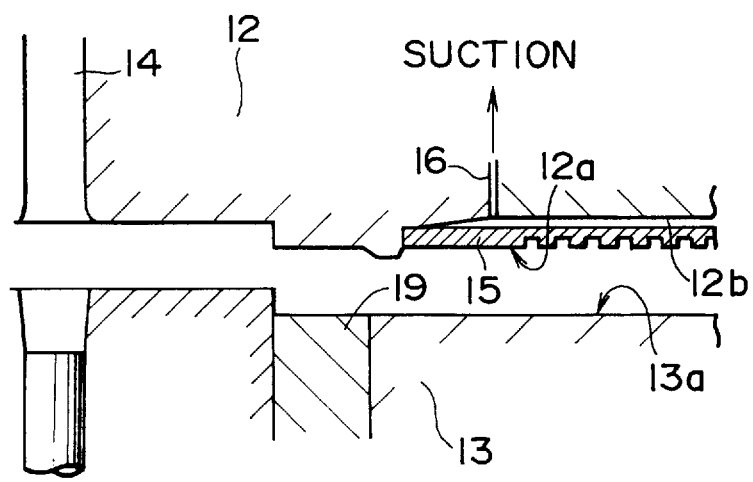
FIG. 4 is a schematic view showing essential portions of an optical disc molding device according to this embodiment.

As shown in FIG. 4, the inside diameter side of the stamper supporting surface 12b protrudes inwardly in the disc thickness direction from the data recording surface.

In the movable mold 13, there is formed a bearing pawl receiver 18 for housing a bearing pawl 17 protruding from the stationary mold 12 so that the stationary mold 12 and the movable mold 13 are combined when the bearing pawl 17 is housed in the bearing pawl receiver 18.

In addition, at the central portion of the movable mold 13, there is provided a tubular extrusion member 19 used to take out the disc substrate molded so as to freely advance or retreat when the movable mold 13 retreats to release the mold.

As described above, the optical disc molding device 11 is constituted, and a molding method for an optical disc according to the embodiment of the present invention is performed using the optical disc molding device 11.

More specifically, the molding method for an optical if disc according to the present invention is to first cause the movable mold 13 to advance so that the bearing pawl 17 is housed within the bearing pawl receiver 18 to combine the stationary mold 12 with the movable mold 13. Then, resin melted by an injection molding machine is flowed into the space formed by the cavities 12a and 13a through an injection tube 14 at a set pressure for injection molding the disc substrate.

As resin material, for example, polycarbonate, acryl and the like having translucence can be used.

Figure 5:
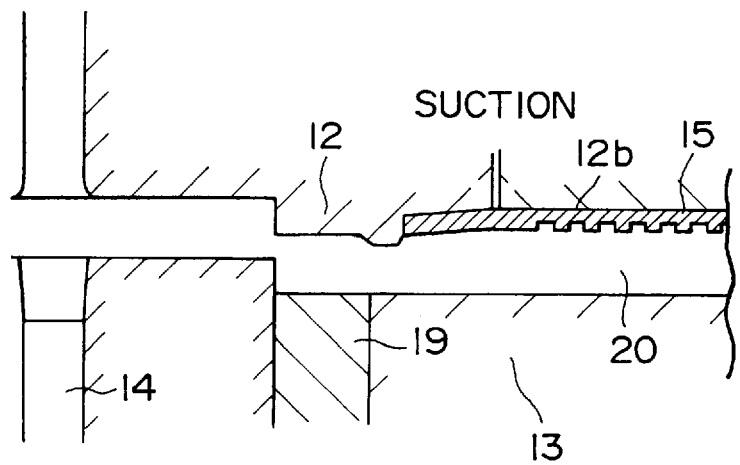
FIG. 5 is a schematic view showing a molded state of a disc substrate in this embodiment.

Then, the stamper 15 is plastically deformed by the injection pressure during disc molding as shown in FIG. 5 to be molded into a shape parallel to the stamper supporting surface 12b.

More specifically, the stamper 15 is shaped such that the inside diameter side protrudes inwardly in the disc thickness direction from the data recording surface in parallel to the stamper supporting surface 12b. Accordingly, when the stamper 15 is pressed against one surface of the disc substrate 20 by the injection pressure, a data recording surface is formed on the disc substrate 20, and the inside diameter side thereof will be dented inwardly in the disc thickness direction with respect to the data recording surface.

After the disc substrate 20 is solidified and cooled, the movable mold 13 is caused to retreat to open the mold, and the extrusion member 19 is caused to protrude into the cavity 13a to take out the disc substrate 20.

When this disc substrate 20 is released from the stamper 15, a burr 21 occurs on the inside diameter side of the disc substrate 20, but in this embodiment, the flatness of the reference plane is not deteriorated because the data recording surface is molded higher than this burr 21.

Figure 6:
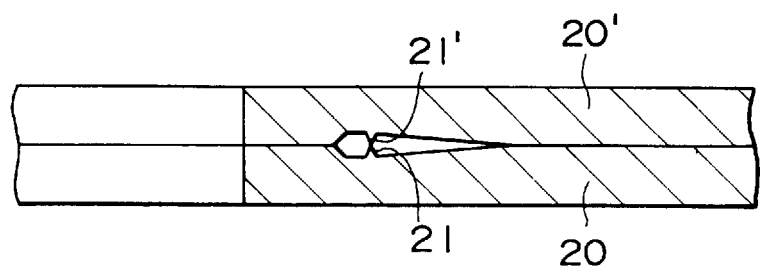
FIG. 6 is a schematic view showing a state in which disc substrates themselves are pasted together in this embodiment.

Accordingly, as shown in FIG. 6, the burrs 21 and 21' are positioned lower than the laminated reference plane even if the disc substrates 20 and 20' themselves are pasted together, and therefore, the pasting can be made satisfactorily.

Next, other embodiments according to the present invention will be described in conjunction with FIGS. 7 to 9.

Figure 7:
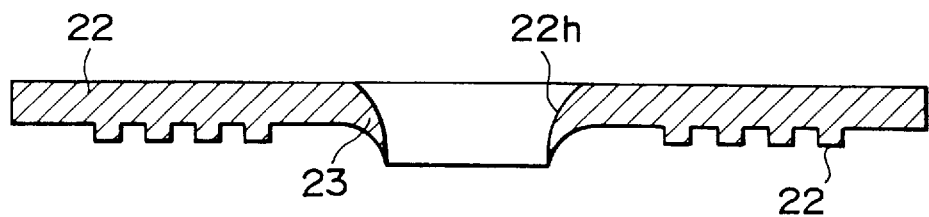
FIG. 7 is a view showing a stamper for use with an optical disc molding device in another embodiment.

In another embodiment, as shown in its schematic sectional view in FIG. 7, a burr 23 occurring when the center hole 22h of a stamper 22 for injection molding is being punched is ensured to be formed on the side of the same plane as a surface on which fine irregularities 22s for transfer have been formed.

Figure 8:
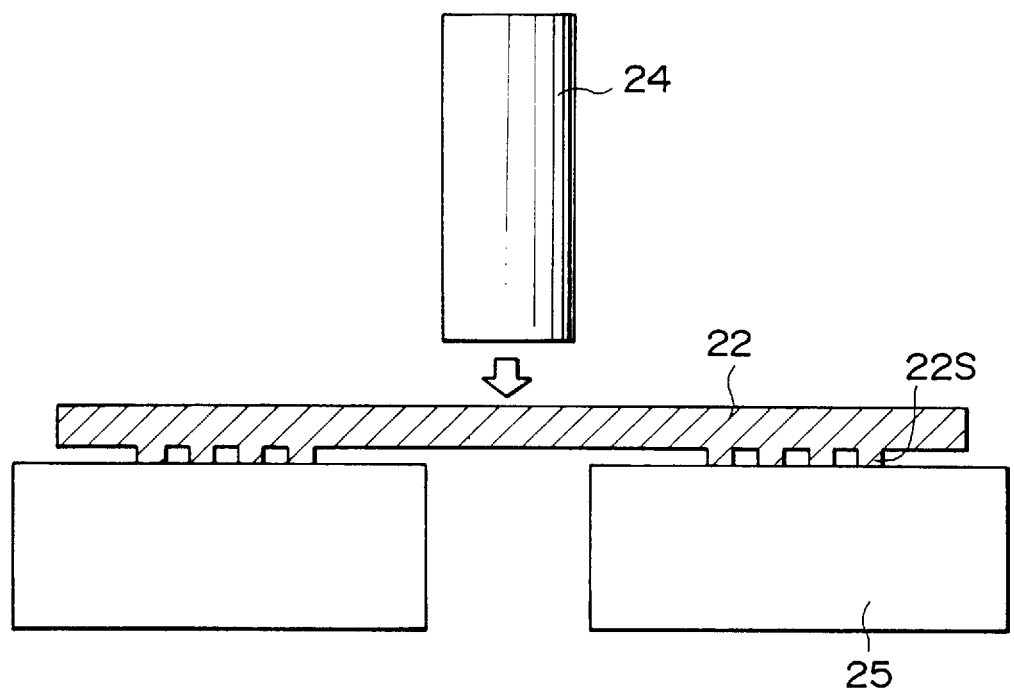
FIG. 8 is a view showing a punching method using the stamper in another embodiment.

FIG. 8 shows how to punch the center hole 22h of the stamper 22.

First, the stamper 22 on which the fine irregularities 22s for transfer have been formed is placed on a stamper installation base 25.

Next, punching is made by a stamper center hole puncher 24 from a plane side on the other side of the plane on which the fine irregularities 22s for transfer have been formed to form the center hole 22h of the stamper.

At this time, the air cylinder pressure used for the stamper center hole puncher 24 is set to, for example, 2 to 3 kg/cm$^2$, or preferably 2.5 kg/cm$^2$, and the knockout spring force is set to, for example, 120 to 150 kg, or preferably 140 kg.

Since the center hole 22h has been punched, as shown in FIG. 7, in the stamper 22 from a plane side on the other side of the plane on which the fine irregularities 22s, of the stamper 22, for transfer have been formed, a burr 23 occurs at the periphery of the center hole 22h on the side of the same plane as the plane on which the fine irregularities 22s have been formed.

Figure 9:
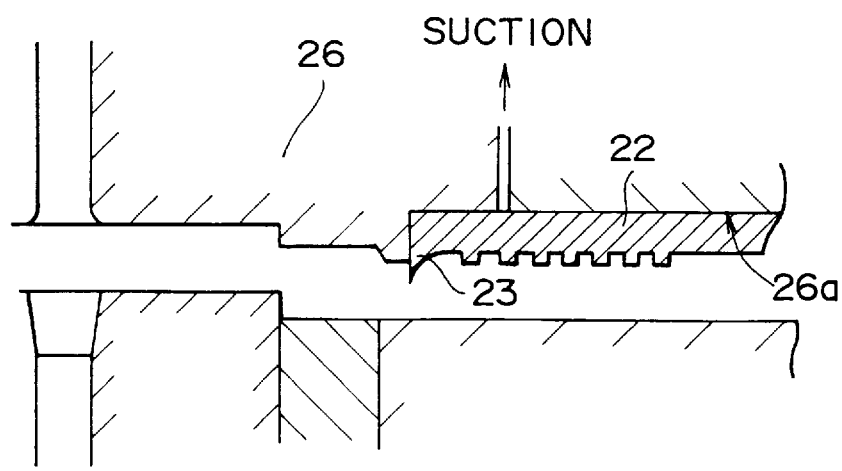
FIG. 9 is a view showing essential portions of an optical molding device in another embodiment.

The stamper 22 thus formed is mounted to the optical disc molding device as shown in FIG. 9.

In FIG. 9, the stamper supporting surface 26a of the stationary mold 26 in the optical disc molding device is flat. Since, however, a burr 23 protrudes inwardly in the disc thickness direction from the data recording surface of the stamper 22, the disc substrate molded thereby will be dented inwardly in the disc thickness direction on the side of its inner diameter with respect to the data recording surface.

Therefore, pasting can be made satisfactorily because the data recording surface is molded higher than a burr even if the burr may occur on the inside diameter side of the disc substrate thus molded.

Therefore, according to the present invention, a burr 21 is positioned lower than the laminated reference plane even if the burr 21 may occur on the inside diameter side of the disc substrate 20 when the disc substrate 20 is released from the stamper 15 after injection molding, and therefore the flatness of the reference plane is not deteriorated.

Also, it is easy to control the inside diameter, shape and the like of the stamper 15 and lip of the mold, and post-machining to remove the burr from the disc substrate is not required.

In addition, since the center hole in the stamper 15 does not require any excessive precision, it becomes easy to control lip of the mold, and the operating efficiency or the like can be improved. Further, since it is not necessary to remove the burr 21, post-machining to remove the burr 21 and the like are not required, thus making it possible to reduce the cost of production and to improve the yield and operating efficiency.

As described above, according to the present invention, it is possible to provide an optical disc molding device capable of preventing the flatness of the laminated reference plane from being deteriorated, easy to control lip of the mold and necessitating no post-machining to remove burrs from the disc substrate, and a molding method for an optical disc using the optical disc molding device.

What is claimed is:

1. An optical disc molding device comprising:
   a pair of molds for injection molding a disc substrate within a cavity;
   a stamper supported within the cavity of at least one mold, having a data recording surface consisting of fine irregularities for transferring recording information onto a disc and;
   a stamper supporting surface within the cavity of said mold, having a horizontal portion, a sloping portion, and a protruding portion with which an inside diameter side of said stamper is brought into contact during molding of said disk, said protruding portion protruding inwardly in a disc thickness direction from said data recording surface of said stamper.

2. An optical disk molding device according to claim 1, wherein an inside diameter of said stamper supporting surface protrudes above a tapered portion inwardly in the disc thickness direction.

3. An optical disc molding device comprising:
   a pair of molds for injection molding a disc substrate within a cavity; and
   a stamper supported within the cavity of at least one mold, having a protruding burr and a data recording surface consisting of fine irregularities for transferring recording information onto a disc,
   wherein the burr of said stamper is brought into contact with the disc substrate during molding of said disc, protruding inwardly in the disc thickness direction.

4. An optical disc molding device according to claim 3, wherein said stamper has a center hole, formed by punching the center of said stamper from a side opposite of a plane on which said data recording surface has been formed, said punching resulting in said burr, protruding around the center hole in the disk thickness direction.

5. An optical disc molding device according to claim 1, wherein said sloping portion is located between said horizontal portion and said protuding portion.

6. An optical disc molding device according to claim 1, further comprising a suction member located between said horizontal portion and said sloping portion.

7. A disc molding method comprising the steps of:
   mounting a stamper, having a data recording surface consisting of fine irregularities for transferring recording information onto a disc, within the cavity of at least one mold, of a pair of molds for injection molding a disc substrate within said cavity; and
   injection molding the disc substrate, and concurrently causing the inside diameter side of said stamper to protrude inwardly in the disc thickness direction from the data recording surface of said stamper.

8. A disc molding method according to claim 7, further comprising molding said stamper into a shape in parallel to a stamper supporting surface in advance of mounting said stamper.

9. A disc molding method according to claim 7, further comprising deforming said stamper into a shape in parallel to a stamper supporting surface by injection pressure during said disc injection molding.

10. A disc molding method according to claim 7, further comprising forming said stamper by punching a center hole from the other side of a plane on which said data recording surface has been formed prior to mounting said stamper.

* * * * *